UNITED STATES PATENT OFFICE.

AUGUST BUECHER, OF HEIDELBERG, GERMANY.

PREPARATION FOR PROTECTING METALS AGAINST CORROSION.

SPECIFICATION forming part of Letters Patent No. 521,600, dated June 19, 1894.

Application filed December 8, 1893. Serial No. 493,173. (No specimens.) Patented in Germany April 7, 1893, No. 72,320.

*To all whom it may concern:*

Be it known that I, AUGUST BUECHER, a subject of the Emperor of Germany, residing in the city of Heidelberg, in the Grand Duchy of Baden and Empire of Germany, have invented certain new and useful Improvements in Preparations for Protecting Metals Against Corrosion, (for which I have obtained Letters Patent in Germany, No. 72,320, dated April 7, 1893,) of which the following is a specification.

This invention relates to an improved composition of matter or paint for protecting steel and iron articles for a considerable time or permanently against corrosion.

The invention consists of a composition of matter or paint for protecting steel and iron articles against corrosion and comprises a dry mixture of finely pulverized metallic zinc, calcium-carbonate and a suitable polishing substance, and an alcoholic solution of a saponate and is prepared in the following manner:

Finely-pulverized metallic zinc and calcium-carbonate are mixed with a suitable polishing substance, such as pulverized tripoli, colcothar or vegetable carbon, which substances are carefully dried, screened and bolted. This pulverized mass is then mixed with an alcoholic solution of a suitable saponate, having the specific gravity of 0.9250. For preparing the saponate-solution, a mixture of two different saponates is preferably used, one being prepared from olive-oil, potash-lye, alcohol and water, and the other of olive-oil, lard, lead oxide, potassium carbonate and water. These two saponates are mixed in equal proportions, and to the mixture is added as much pure benzene as it can take up before becoming turbid. The pulverized mass and the liquid mixture of the saponates are placed in separate vessels until they are required for use, as the mixing of the same in a closed vessel is not admissible owing to the strong reaction of the ingredients on each other.

Immediately before use, the component parts of the paint are intimately mixed in a suitable vessel with a brush, which is used later on for applying the paint. The proportion of the pulverized mass to the alcoholic saponate-solution is one part by weight of the former to two parts by weight of the latter. The mixture is permitted to stand in a cool place without exposure to the sun for ten or fifteen minutes, after which time the composition has the proper consistency for use. The steel or iron articles to be coated are first carefully cleaned of all adhering grease or other impurities before applying the coating of protective paint.

Surfaces which are under roof and protected against the direct influence of the atmosphere, are given a single coat; while surfaces which are subjected to the influence of the atmosphere, require two coats of my improved paint. The paint is spread over the surface in such a manner that the metal is not visible through the same. The composition dries as soon as applied and hardens under the influence of the atmospheric air in a few days to such an extent that neither the beating of heavy rains nor the influence of snowstorms can in the least impair the protective coating. In case the iron or other articles which are coated with the composition, are to be used, the protective coat of paint is carefully brushed until perfectly dry and smooth, which is accomplished in a few moments. A gumming or softening of the coating which is frequently the case with anti-rust preventives heretofore in use, does not take place with my improved composition. The polish and gloss of the metallic surfaces coated by the same remain untarnished for years and can even be increased by repeated brushing, as by gradual abrasion of the pasty substances in the coating, the polishing substances are called more and more into action. The steel and iron surfaces are therefore protected from corrosion as long as their surfaces are coated with my improved composition.

The composition is especially adapted for the preservation of fire-arms, surgical instruments, stationary machinery and reserve-parts of the same, and for all such articles of iron or steel which are to be kept in stock for some time before applied to use.

A coat of oil-paint can be applied immediately after the anti-corrosive coat is applied to the surfaces, a single coat of each giving sufficient protection for the surface coated.

The advantages of my improved anti-rust paint as compared to the ordinary red-lead or iron-paint compositions are readily perceived: First, my improved paint does not scale off as is the case with the red-lead paints; second, the injurious influence of the red-iron paints, which is due to the considerable quantity of sulphur-metals and sulfate-salts in the same, are entirely obviated; third, a single coat of the anti-corrosive paint is sufficient, so that in connection with the comparatively low price of the composition, a considerable saving is obtained, in-as-much as all the operations of painting the surfaces may be accomplished quickly one after the other.

Having thus described my invention, I claim as new and desire to secure by Letters Patent—

1. An anti-corrosive paint for steel and iron articles, which consists of an intimate mixture of finely-pulverized metallic zinc, calcium-carbonate and a suitable polishing substance with an alcoholic saponate-solution, substantially as set forth.

2. An anti-corrosive paint-composition for steel and iron articles, which consists of the mixture of finely-pulverized metallic zinc, calcium-carbonate and a suitable polishing substance with an alcoholic solution of saponates and benzene, substantially as set forth.

In testimony that I claim the foregoing as my invention I have signed my name in presence of two subscribing witnesses.

AUGUST BUECHER.

Witnesses:
 A. B. BEYRENTHER,
 THEODORE KÜRRER.